Feb. 17, 1970   C. J. BOTSOLAS ET AL   3,495,629
METHOD AND DEVICE FOR COVERING PIPEFITTINGS
Filed Jan. 27, 1966   5 Sheets-Sheet 1
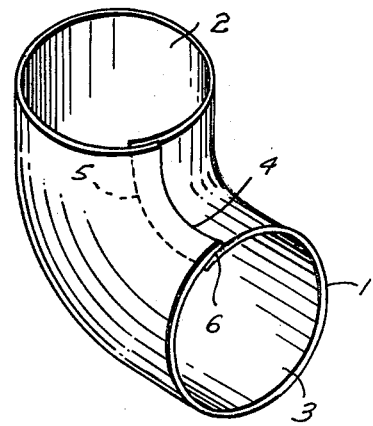
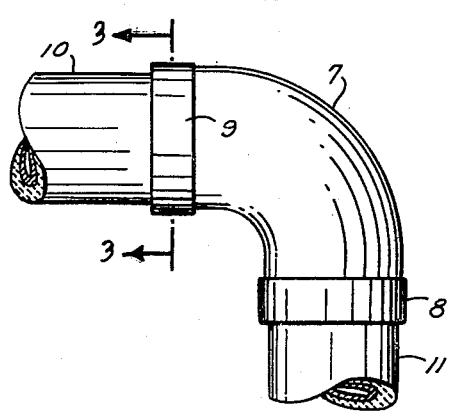
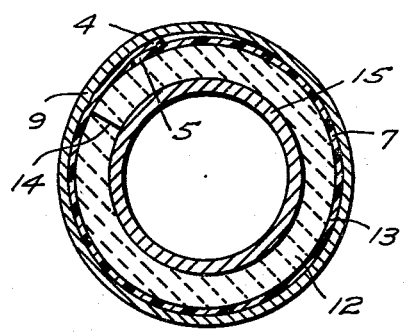
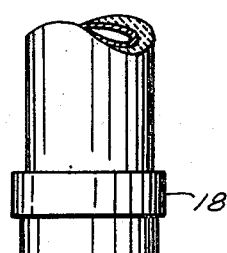
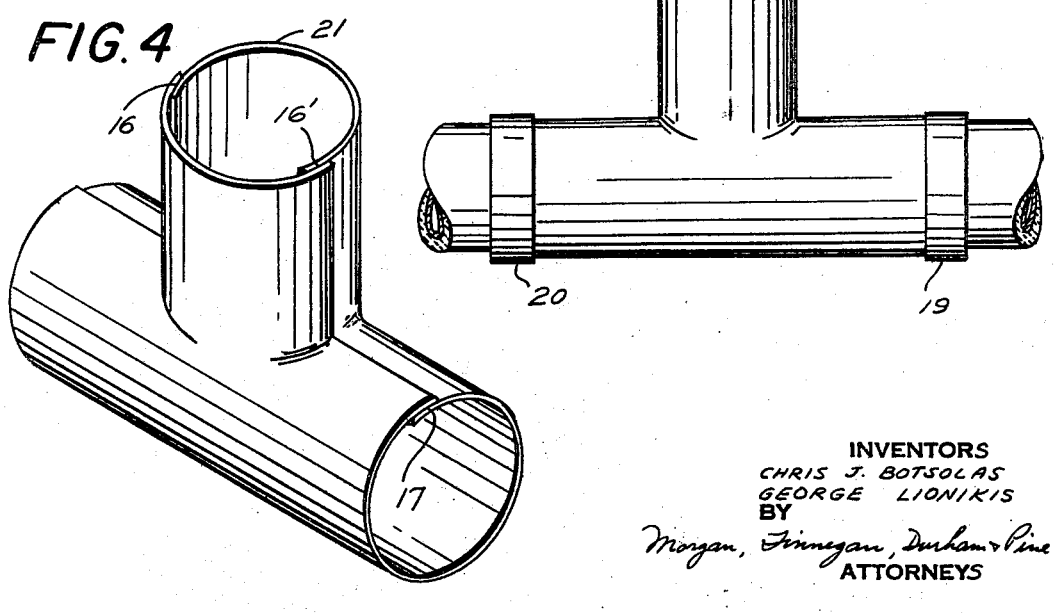
INVENTORS
CHRIS J. BOTSOLAS
GEORGE LIONIKIS
BY
Morgan, Finnegan, Durham & Pine
ATTORNEYS INVENTORS
CHRIS J. BOTSOLAS
GEORGE LIONIKIS
BY
MORGAN, FINNEGAN, DURHAM & PINE
ATTORNEYS

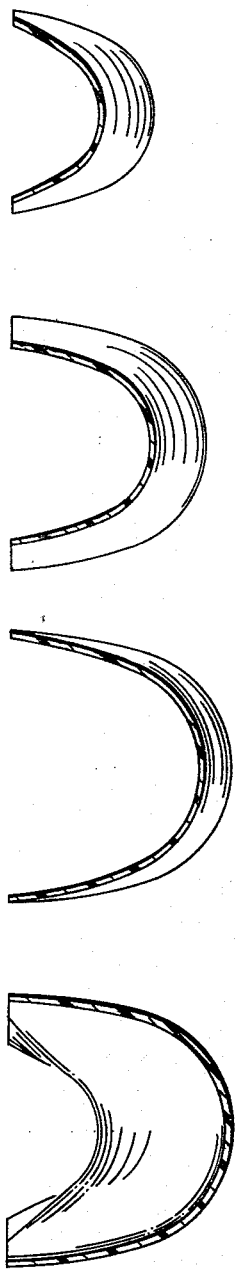

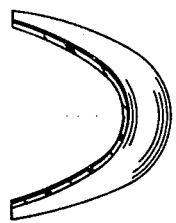
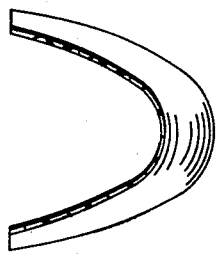
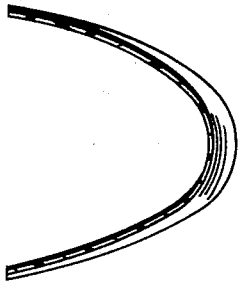
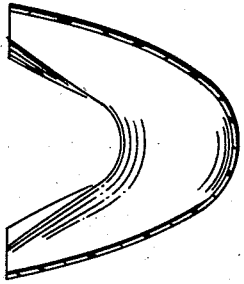

United States Patent Office 3,495,629
Patented Feb. 17, 1970

3,495,629
METHOD AND DEVICE FOR COVERING PIPEFITTINGS
Chris J. Botsolas, 221 Rector St., Perth Amboy, N.J. 08861, and George Lionikis, Metuchen, N.J.; said Lionikis assignor to said Botsolas
Continuation-in-part of application Ser. No. 376,759, June 22, 1964. This application Jan. 27, 1966, Ser. No. 523,352
Int. Cl. F16l 59/16
U.S. Cl. 138—149   8 Claims

ABSTRACT OF THE DISCLOSURE

A method and article for covering pipefittings wherein the cover is formed when a flexible, resilient material as a single, integral structure. In one embodiment, the cover is formed in the same shape as the fitting to be covered and is spread apart for placing about the fitting, whereupon it naturally springs back into the shape of the fitting. In a second embodiment, the cover is formed in a shape not resembling the fitting to be covered, but is adapted to be easily "sprung" into the same shape as the fitting. The elbow joint is disclosed as an example of the second embodiment, in which case the cover is formed in the shape of an elongated, open-ended, trough-like member with the central portion of the trough expanded away from the top of the trough so as to have a profile approximating a sine curve. Upon placing the expanded portion of the trough on the convex side of the elbow joint and bringing the open ends together, the cover naturally springs into the shape of the elbow joint.

---

The present application is a continuation-in-part of my copending application Ser. No. 376,759, filed June 22, 1964 and now abandoned.

This invention relates generally to pipefitting covers and relates more particularly to a new and improved method for covering pipefittings and to a new and useful pipefitting cover formed as a single, integral structure.

Heretofore, the conventional practice for insulating pipefittings such as elbows, T's, valves, flanges, return bends, Y branches, reducing fittings, strainers, unions, various specialty fittings and the like has been an essentially manual and time consuming operation accomplished by spreading several layers of cement in place by hand and then adhering a fabric thereover, followed by additional cement layers. An alternative method employed aluminum half section fitting covers which were positioned on the fitting and then the two half sections were fastened together, after shaping the aluminum to the proper dimensions, by drilling holes and inserting sheet metal screws. Generally, the application of aluminum half sections in this manner has been considered a two man operation.

In accordance with this invention, a much more convenient method of pipe covering is employed which enables rapid and permanent application by one man who need not be skilled in the art of applying pipefitting covers. The pipefitting covers according to the invention can be used under any conditions, hot or cold, overground, underground or underwater and can be fabricated and be fire resistant and/or water proof and/or vapor proof and/or corrosion resistant and are uniform in appearance.

It is among the objects of this invention to provide a novel pipefitting cover.

Another object of the present invention is to provide a novel pipefitting cover which can be more conveniently and easily installed, at significantly faster rates and lower costs, than heretofore possible with conventional pipefitting covers.

Another object of the present invention is to provide a novel pipefitting cover which may be economically produced by conventional forming or molding techniques.

Another object of the present invention is to provide a novel pipefitting cover which eliminates the disadvantages of previously known, conventional pipefitting covers.

Another object of the present invention is to provide a novel pipefitting cover formed from a flexible, resilient material as a single, integral structure and which is adapted to be easily and quickly placed in position surrounding the pipefitting.

Another object of the present invention is to provide a novel pipefitting cover formed from a flexible, resilient material as a single, integral structure which is of a shape normally in the general configuration of the fitting to be covered.

Another object of the present invention is to provide a novel pipefitting cover formed from a flexible, resilient material as a single, integral structure into a first position, which does not resemble the fitting to be covered and which is adapted to be thereafter formed into a second position, having a shape normally in the general configuration of the fitting.

Another object of the present invention is to provide a novel pipefitting cover formed from a flexible, resilient material as a single, integral structure having a shape which normally does not resemble the fitting to be covered but which is adapted to be formed into the general configuration of the fitting at the time of installation.

Another object of the present invention is to provide a novel pipefitting cover particularly adapted for covering an elbow joint, formed from a flexible, resilient material as a single, integral structure having the shape of an elongated, open-ended trough, the central portion of the trough being expanded outwardly from the top thereof, and which is adapted to be placed into position and formed about the elbow joint during installation, the cover thereafter having a shape in the general configuration of the elbow joint.

A further object of the present invention is to provide a novel method for covering a pipefitting.

A further object of the present invention is to provide a novel method for covering a pipefitting which can be performed more conveniently and easily, and at a significantly faster rate, than heretofore possible with conventional methods for covering pipefittings.

A further object of the present invention is to provide a novel method for insulating pipefittings.

A further object of the present invention is to provide a novel method for insulating pipefittings which can be performed more conveniently and easily, and at a significantly faster rate, than heretofore possible with conventional methods for insulating fittings.

Objects and advantages of the invention are set forth in part herein and in part will be obvious herefrom, or may be learned by practice with the invention, the same being realized and attained by means of the parts, steps, process, instrumentalities and combinations pointed out in the appended claims.

The invention consists in the novel parts, steps, process, constructions, arrangements, combinations and improvement herein shown and described.

Briefly described, the pipefitting cover of the present invention comprises, in a first embodiment, an integral, i.e., one piece, structure, preformed of a shape normally in the general configuration of the pipefitting to be covered. This integral structure is provided with an opening along one face to facilitate spreading the structure apart so that it can be placed in position surrounding the pipefitting.

This pipefitting cover is preferably made of a thin walled material, having sufficient resilience to permit the structure to be spread apart when it is desired that it be placed in position surrounding the pipefitting and then returned to its normal configuration. Since pipefittings come in standard sizes, it is extremely simple to provide integral pipe coverings in accordance with this invention of the correct size for the various standard fittings.

After the pipefitting is spread apart, it is positioned over the pipefitting and again returned to its normal unspread position. The opening to facilitate the spreading is then sealed and the fitting cover is thereby affixed permanently in place. Of course, the fitting cover can be conveniently slit open and removed should inspection of the pipe become necessary. The thus slit open covering can again be replaced and resealed when desired.

As can be understood, the location of the opening in the fitting cover is not critical but can be in any position that will enable the fitting cover to be spread open and positioned around the fitting. In some instances, more than one opening will be necessary for adequate spreading. However, in all instances, the fitting cover must remain integral, i.e., in one piece, since if more than one piece is involved, the prior art problems of accurate positioning which often require the use of trained labor and more than one person, are again encountered.

In a preferred alternate embodiment, the pipefitting cover of the present invention is formed from a flexible, resilient material as a single, integral structure of a shape which normally is not in the general configuration of the fitting to be covered but which is adapted to be formed into the configuration of the fitting at the time of installation. When the fitting to be covered is an elbow joint, the cover in accordance with this embodiment is formed in the shape of an elongated, open-ended, preferably substantially semi-cylindrical trough, the central portion of the trough being expanded outwardly from the top thereof. Upon folding the open ends toward each other during installation, their curvature is reversed and they will naturally snap or spring into a slightly overlapping relationship, fitting the inner, concave portion of the elbow joint, with the expanded portion of the trough fitting the outer, convex portion of the elbow. The longitudinal edges of the trough are also thereby formed into substantially circular shape and define the open ends of the installed fitting cover.

In many instances, a fitting cover in accordance with the invention can be fabricated from a suitable synthetic plastic material having insulating properties and the fitting cover serves as both covering and insulator. However, in some instances, it is desirable to provide additional insulation. This can be accomplished by merely wrapping an insulating material, such as an asbestos or fibrous glass sheet, around the fitting and thereafter positioning a fitting cover in accordance with the invention about the fitting. Alternatively, after the fitting cover is put in position, if a somwhat larger size fitting cover is employed than would otherwise be the case if a tight fit were desired, a viscous insulating material or a foam can be injected between the fitting cover and the fitting before the fitting cover is sealed. Cement or various viscous silicate-based insulating materials are available and can be used for this purpose.

A preferred method of accomplishing insulation and covering involves fabricating the covering from a thin walled material as previousy described but in addition, applying a layer of an insulating material to the interior surface thereof so that the fitting cover and insulating material can be applied together in one simple and convenient operation.

It will be understood that the foregoing general description and the following detailed description as well are exemplary and explanatory of the invention but are not restrictive thereof. The accompanying drawings, referred to herein and constituting a part hereof, illustrate preferred embodiments of the invention, and together with the description, serve to explain the principles of the invention.

Of the drawings:

FIGURE 1 is an isometric view of a first embodiment of a pipefitting cover constructed in accordance with the present invention, illustrated as having a shape in the general configuration of an elbow joint;

FIGURE 2 is a view in side elevation of the elbow cover of FIGURE 1, illustrated in position on a pipe elbow joint;

FIGURE 3 is a sectional view taken along line 3—3 of FIGURE 2, showing an insulating layer attached to the interior surface of the positioned pipefitting covering;

FIGURE 4 is an isometric view of a further form of the first embobidment of a pipefitting cover constructed in accordance with the present invention, illustrated as having a shape in the general configuration of a T-joint;

FIGURE 5 is a view in side elevation of the T cover of FIGURE 4, illustrated in position on a pipe T-joint;

FIGURES 7A, 7B, 7C, 7D, 7E, 7F and 7G are a series of sectional views taken along lines 7A—7A, 7B—7B, 7C—7C, 7D—7D, 7E—7E, 7F—7F and 7G—7G of FIGURE 7, respectively, illustrating the curvature of the cover in the shape shown in FIGURES 6 and 7;

Figure 9:
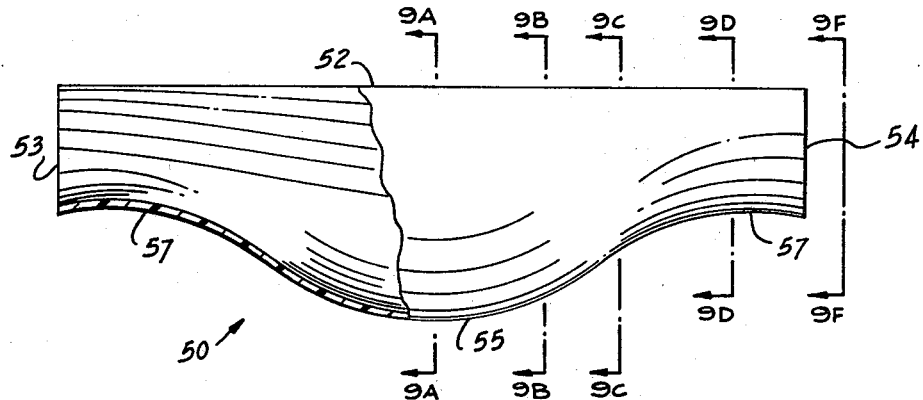
FIGURE 9 is a view in side elevation of a second embodiment of a pipefitting cover constructed in accordance with the present invention, which is adapted to cover a 45° elbow joint, illustrated in a first shape.
Figure 10:
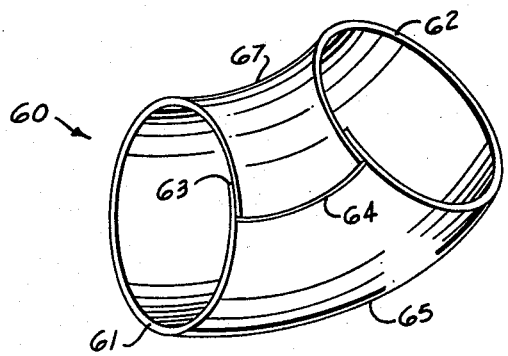

FIGURES 9A, 9B, 9C, and 9D and 9E are a series of sectional views taken along lines 9A—9A, 9B—9B, 9C—9C, 9D—9D and 9E—9E of FIGURE 9, respectively illustrating the curvature of the cover in the shape shown in FIGURE 9;

FIGURE 10 is an isometric view of the pipefitting cover of FIGURE 9, illustrated in a second position, having a shape in the general configuration of a 45° elbow joint.

For the purposes of this specification, unless otherwise specified, the term "pipefitting" shall be intended to refer to a fitting in general, whether or not specifically a part of a pipe, per se, both insulated and non-insulated, including, but not necessarily limited to, elbows, T's, valves, flanges, return bends, Y branches, reducing fittings, strainers, unions, as well as various specialty fittings.

Referring now more particularly to the embodiment of the pipefitting cover of the invention illustrated in FIGURES 1–5 of the accompanying drawings, as shown in FIGURE 1, the elbow covering is fabricated from a relatively thin walled material 1 such as a vinyl resin. Ideally, this thin walled material should be a semi-rigid material which will have sufficient rigidity and resilience to be spread apart and when released, to resume its original configuration. The cover should be preformed to its desired configuration prior to use. This is generally done by molding or hot or cold forming by conventional methods to the desired specifications. As shown in FIGURE 1, the elbow covering is made in one piece having a hollow interior 2 for passage therethrough of the pipe, and overlapping edges 4 and 5 which can be spread apart manually to create and enlarge an opening 6 between them so that the covering can be positioned over the pipe.

In an alternative form of this embodiment, which in certain instances facilitates manufacture, the elbow cover or other fitting cover can be manufactured in two pieces and then the two halves can be cemented together along one face to yield an integral, i.e. one piece structure of the type shown in FIGURE 1. This cementing together, must be done in advance of operations, in order to achieve the benefits of this invention.

When it is desired to apply the elbow covering, the ends 4 and 5 are spread apart, the elbow cover is superimposed around the pipe, pressure is released and edges 4 and 5 are permitted to return to their original position or are returned there manually whereupon the edges 4 and 5 are sealed. Where the two edges 4 and 5 overlap as shown in FIGURE 1, it is a convenient matter to apply an appropriate adhesive such as an epoxy cement or a rubber silicone adhesive to permanently seal the two edges in position. Where the two edges 4 and 5 do not overlap but instead abut one against the other, alternative methods of sealing can be employed, such as, for example, the use of heat sealing, or the use of sealing tape, of solvent welding or of various fastening means such as snap fasteners, hooks or the like attached directly in position on the fitting cover.

FIGURE 2 illustrates the fitting cover in its final position on the pipes. The fitting cover is illustrated as 7 and it is positioned surrounding the fitting. Positioned at each end of the fitting are metal rings 8 and 9 serving to give a more finished appearance between the fitting cover 7 and the conventional pipe covering 10 and 11 on either side.

Referring to FIGURE 3, there is shown a layer of asbestos insulator 12 attached directly to the interior surface 13 of the elbow cover. The asbestos layer 12 is split at a line 14 corresponding to the initial point of contact between edges 4 and 5 thereby insuring that the seal will be between the two edges of the elbow covering without any intermediate asbestos layer to interfere with the seal. Thus on the elbow cover, no asbestos is attached to that portion of edge 4 that overlaps edge 5. The layer of asbestos is of a thickness selected so that it neatly fills the space between the elbow covering 7 and the elbow joint 15.

FIGURES 4 and 5 illustrate another form of the first embodiment of a pipefitting cover of the invention, which is in the shape of a T-cover. Because of its complex shape, and to facilitate complete opening for super-positioning on the T joint, the T-cover must have openings to facilitate spreading along three sides, in each case using overlapping edges as shown at 16, 16' and 17. This T-joint covering would be applied in the identical manner as the elbow covering of FIGURE 1, and is shown in position on the joint in FIGURE 5, also containing metal rings 18, 19 and 20. The rigidity and resilience of the covering material holds the T-cover in place while the openings are being sealed.

It will be understood that the fitting cover can, if desired, be fabricated to extend beyond the fitting itself to cover a portion of the pipe joined to the fitting.

Referring now to the embodiment of the pipefitting cover of the invention illustrated in FIGURES 6–10 of the accompanying drawings, there is shown a single, integral covering structure adapted to form a fitting cover for an elbow joint.

Figure 7:
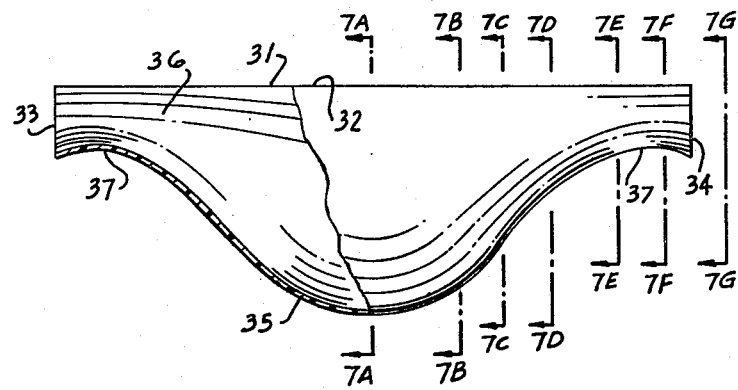
FIGURE 7 is a view in side elevation of the pipefitting cover of FIGURE 6.
Figure 8:
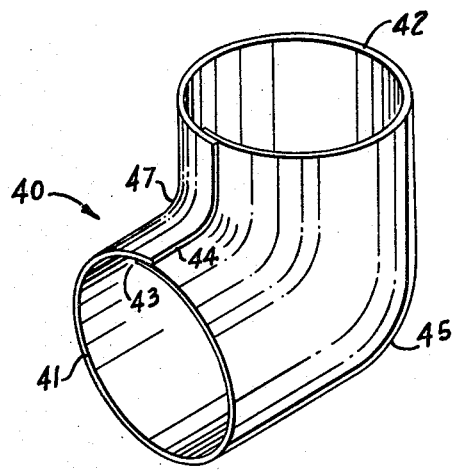
FIGURE 8 is an isometric view of the pipefitting cover of FIGURE 6, illustrated in a second position, having a shape in the general configuration of a 90° elbow joint.
Figure 6:
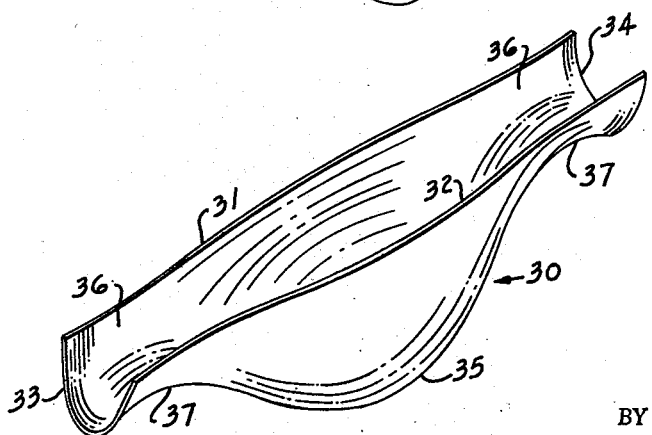
FIGURE 6 is a perspective view of a second embodiment of a pipefitting cover constructed in accordance with the present invention, adapted to cover a 90° elbow joint, illustrated in a first shape.

Referring more particularly to FIGURES 6–8, there is illustrated a single, integral, relatively thin-walled fitting structure adapted to form a fitting cover for a 90° elbow joint, having a first shape indicated generally by reference numeral 30 and a second shape indicated generally by reference numeral 40.

As seen in FIGURES 6, 7, and 7A–7G, the structural shape 30 does not resemble the general configuration of a 90° elbow but is in the shape of an elongated trough, having generally straight, longitudinal edges 31, 32 and ends 33, 34 which are open-ended and preferably approximate a semi-circular or parabolic section (see, e.g., FIGURE 7G). The central portion of the trough is expanded outwardly in a direction away from the longitudinal edges 31, 32, as shown at 35, thereby forming a partial trough channel 36 at each end of the trough 30, the channels 36 preferably approximating a semi-cylindrical or parabolic configuration (see FIGURES 7E and 7F). The central portion 35 is preferably expanded so as to have a sinusoidal profile, as best illustrated in FIGURE 7. The transverse curvature of the bottom surfaces 37 of the partial trough channels 36 is of a curvature generally reverse to that of the inner concave surface of the elbow joint to be covered, as more fully described in the succeeding paragraph.

The elongated trough shape 30 is thereafter formed into a shape in the general configuration of the 90° elbow joint to be covered, as illustrated at 40 in FIGURE 8. This forming may be accomplished by folding the open ends 33, 34 into overlapping relationship, so as to have a reverse curvature 43, 44 from that of the curvature shown at 33, 34. At the same time, the curvature across the inner concave surface 47 of the formed elbow cover is reversed from the curvature of surfaces 37 of trough 30. Alternatively, this forming may be accomplished by merely folding the open ends toward each other, and the ends will thereafter naturally snap or spring into the aforedescribed overlapping relationship. While it is not desired to predicate patentability on any particular theory, this "reverse curvature-snap action" is believed to be obtained as a result of the compound curve construction of the trough, in combination with the flexibility and resiliency of the material from which the cover is formed.

FIGURES 9–10 illustrate another fitting structure similar to that shown in FIGURES 6–8, but which is adapted to form a fitting cover for a 45° elbow joint. Thus, the structure has a first shape, indicated generally by reference numeral 50, and a second shape indicated generally by reference numeral 60.

As in the case of the 90° elbow fitting cover, the structural shape 50 does not resemble the general configuration of a 45° elbow joint but is in the shape of an elongated trough, having generally straight, longitudinal edges 51, 52 and ends 53, 54 which are open-ended and preferably approximate a semi-circular or parabolic section (see e.g., FIGURES 9D and 9E). The central portion of the trough is expanded outwardly in a direction away from the longitudinal edges 51, 52 as shown at 55, thereby forming a partial trough channel 56 at each end of the trough 50, the channels 56 preferably approximating a semi-cylindrical or parabolic configuration (see FIGURE 9D). The central portion 55 is preferably expanded so as to have a sinusoidal profile, as best illustrated in FIGURE 9, although the amplitude thereof is less than that for the 90° fitting cover. The transverse curvature of the bottom surfaces 57 of the partial trough channels 56 is of a curvature generally reverse to that of the inner concave surface of the elbow joint to be covered.

In the same manner as described for trough 30, the elongated trough shape 50 is thereafter formed into a shape in the general configuration of the 45° elbow joint to be covered, as illustrated at 60 in FIGURE 10, with ends 53, 54 overlapping and assuming a reverse curvature at 63, 64; the curvature across the inner concave surface 67 reversed from the curvature of surfaces 57 of trough 50; expanded portion 55 of the trough forming the outer convex portion 65 of the formed elbow cover; and the longitudinal edges 51, 52 formed into substantially circular edges 61, 62 defining the open ends of the formed elbow cover.

As in the case of the previous embodiment of a pipefitting cover of the invention, structural shapes 30 and 50 may be formed by molding, hot or cold forming, or otherwise formed by conventional methods to the desired specifications. Also, as in the case of the previous embodiment, these covers may be formed in various sizes so as to accommodate the various standard fitting sizes.

It will be understood that pipefitting covers constructed according to the second embodiment of the invention for elbow coverings would be stored and shipped while in the trough-like shape, permitting the fittings to be stacked in superimposed relationship, which results in great savings of space and shipping costs over other fitting cover structures.

As a further advantageous feature, the fitting covers of this invention can be made of colored materials or can be made transparent to facilitate observation of the enclosed fittings.

Having the foregoing description of the pipefitting covers constructed in accordance with the second embodiment of the invention in mind, the method of covering an elbow fitting according to the invention includes placing the expanded portion of the trough over the outer, convex surface of the elbow joint, forming the trough into a shape in the general configuration of the elbow joint by folding the open ends of the trough into overlapping relationship, so as to fit the inner concave portion of the elbow joint, the expanded portion of the trough thereby fitting the outer convex portion of the elbow joint, and thereafter sealing the overlapping end portions so as to seal the fitting cover to the joint.

Alternatively, the open ends may be merely folded toward each other, and the ends will then naturally snap or spring into overlapping relationship, in the manner previously described.

The trough is preferably manually formed into the shape of the fitting to be covered, but other suitable forming means may be employed. Additionally, suitable sealing means such as that described for the previous embodiment may be employed.

Where the pipefitting is to be insulated, it will be understood that the insulation is installed about the fitting before the cover is placed and formed about the fitting, as more fully described in connection with the previous embodiment.

While it will be understood from the foregoing description that neither the method or the pipefitting covers of this invention are in any way limited to the use of particular materials for forming the pipefitting coverings, certain materials have been found to produce highly satisfactory results and are given as an example herein, from which other equivalent materials will be apparent to those of ordinary skill in the art. Thus, it has been found that a vinyl resin material, such as poly vinyl chloride, can be produced having suitable flexibility and resiliency and which can be conveniently molded or otherwise formed into the desired configuration. In addition to the other known desirable properties of the vinyl resins, these materials are sufficiently high temperature resistant to permit their use as an insulating covering.

The invention in its broader aspects is not limited to the specific embodiments herein shown and described but departures may be made therefrom within the scope of the accompanying claims, without departing from the principles of the invention and without sacrificing its chief advantages.

What is claimed is:

1. A pipefitting for covering an elbow joint, formed from a flexible, resilient material as a single, integral structure in a first elongated, open-ended, trough-like shape, said structure adapted to be folded into a second shape which is substantially the same as that of the elbow joint to be covered.

2. A pipefitting cover as claimed in claim 1, wherein the central portion of the trough is expanded in a direction away from the top thereof, said cover adapted to be placed into an open position surrounding said elbow joint and to be thereafter folded into said second shape in a closed position about said elbow joint.

3. A pipefitting cover as claimed in claim 2, whereby said cover is folded into said second shape by folding said open toward each other and into overlapping relationship so as to conform to the inner, concave portion of the elbow joint, the expanded portion of the trough conforming to the outer, convex portion of the elbow joint, and the longitudinal edges of the trough are each formed into a substantially circular shape which define the open ends of the installed fitting cover.

4. A pipefitting cover as claimed in claim 3, wherein the profile of the expanded portion of the trough generally approximates a sine curve.

5. A pipefitting cover as claimed in claim 1, wherein said cover is folded into said second shape by folding said open ends towards each other, whereupon said ends naturally spring into overlapping relationship and conform to the inner, concave portion of the elbow joint, the expanded portion of the trough conforming to the outer, convex portion of the elbow joint, and the longitudinal edges of the trough are each formed into a substantially circular shape which define the open ends of the installed fitting cover.

6. A method of covering an elbow joint pipefitting comprising the steps of, forming a flexible, resilient material into a single, integral cover structure in the shape of an elongated, open-ended trough-like configuration with the central portion of the trough expanding in a direction away from the top thereof, placing the expanded portion of said trough over the outer convex surface of the elbow joint to be covered with the ends thereof extending transversely of the joint, folding said cover structure into a closed position about the joint in a shape which is substantially the same as that of the joint, and sealing the edge portions of the elbow-shaped covering structure.

7. A method of covering an elbow joint pipefitting as claimed in claim 6, wherein the cover structure is folded into the shape of the elbow joint in the closed position thereabout by folding said open ends toward each other and into overlapping relationship so as to conform to the inner concave portion of the elbow joint, the expanded portion of the trough conforming to the outer convex portion of the elbow joint, and the longitudinal edges of the trough are each formed into a substantially circular shape which define the open ends of the installed fitting cover.

8. A method as claimed in claim 6, wherein said cover structure is folded into the shape of the elbow joint in the closed position thereabout by folding said open ends toward each other whereupon said ends naturally spring into overlapping relationship and conform to the inner concave portion of the elbow joint, the expanded portion of the trough conforming to the outer convex portion of the elbow joint, and the longitudinal edges of the trough are each formed into a substantially circular shape which define the open ends of the installed fitting cover.

References Cited

UNITED STATES PATENTS

| | | | |
|---|---|---|---|
| 1,704,760 | 3/1929 | Parker | 138—99 |
| 2,470,499 | 5/1949 | Lapp | 285—45 |
| 2,756,172 | 7/1956 | Kidd | 138—149 XR |
| 3,153,546 | 10/1964 | Dunn | 285—47 XR |
| 3,177,528 | 4/1965 | Flower et al. | 285—45 XR |
| 3,222,777 | 12/1965 | Rutter et al. | 285—45 XR |
| 3,307,590 | 3/1967 | Carlson | 138—149 |
| 3,321,924 | 5/1967 | Liddell | 138—97 XR |

FOREIGN PATENTS

| | | |
|---|---|---|
| 1,347,492 | 11/1963 | France. |
| 82,489 | 2/1919 | Switzerland. |

LAVERNE D. GEIGER, Primary Examiner

H. K. ARTIS, Assistant Examiner

U.S. Cl. X.R.

138—97, 178

PO-1050
(5/69)

UNITED STATES PATENT OFFICE
CERTIFICATE OF CORRECTION

Patent No. 3,495,629      Dated February 17, 1970

Inventor(s) C.J. Botsolas et al

It is certified that error appears in the above-identified patent and that said Letters Patent are hereby corrected as shown below:

Column 7, line 72, Claim 3, "said open toward each other" should read --said open ends toward each other--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents